US008719253B2

(12) United States Patent
Srinivasan et al.

(10) Patent No.: US 8,719,253 B2
(45) Date of Patent: May 6, 2014

(54) METHOD AND APPARATUS FOR EFFICIENTLY ORGANIZING HIERARCHICAL QOS POLICIES

(75) Inventors: Vijay Srinivasan, Bangalore (IN); Arun Srinivasan, Bangalore (IN); Jay Shah, Morgan Hill, CA (US); Aijaz Pathan, Austin, TX (US); Yen Teresa Nguyen, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 98 days.

(21) Appl. No.: 12/958,148

(22) Filed: Dec. 1, 2010

(65) Prior Publication Data

US 2012/0143876 A1 Jun. 7, 2012

(51) Int. Cl.
G06F 17/30 (2006.01)
G06F 15/173 (2006.01)

(52) U.S. Cl.
USPC ............................ 707/715; 707/747; 709/226

(58) Field of Classification Search
USPC ................................. 707/715, 747; 709/226
See application file for complete search history.

(56) References Cited

U.S. PATENT DOCUMENTS

| 5,802,146 | A * | 9/1998 | Dulman ..................... 379/32.03 |
| 7,058,639 | B1 * | 6/2006 | Chatterjee et al. ................... 1/1 |
| 2001/0019539 | A1 * | 9/2001 | Kawakami .................... 370/256 |
| 2002/0065907 | A1 * | 5/2002 | Cloonan et al. ................ 709/223 |
| 2002/0067849 | A1 * | 6/2002 | Klassen et al. ................. 382/162 |
| 2002/0122422 | A1 * | 9/2002 | Kenney et al. ................. 370/392 |
| 2002/0124086 | A1 * | 9/2002 | Mar ............................. 709/226 |
| 2003/0131182 | A1 * | 7/2003 | Kumar et al. ...................... 711/5 |
| 2003/0187817 | A1 * | 10/2003 | Agrawal et al. .................... 707/1 |
| 2004/0225898 | A1 * | 11/2004 | Frost et al. ..................... 713/201 |
| 2005/0091510 | A1 * | 4/2005 | McKeon et al. .............. 713/185 |

OTHER PUBLICATIONS

Cisco Systems, Modular Quality of Service Command Line Interface Overview, 2003.*
In et al., Policy Based Scheduling for Simple Quality of Service in Grid Computing, 2004.*
Sahni, Hashing-Probing Strategies, 1999.*
Smith, AVL Balanced Binary Tree with Duplicats handling and GUI Demo, 2001.*

* cited by examiner

*Primary Examiner* — James Trujillo
*Assistant Examiner* — William Spieler
(74) *Attorney, Agent, or Firm* — Merchant & Gould

(57) ABSTRACT

Consistent with embodiments of the present invention, a method may be provided comprising receiving a search string corresponding to a desired node comprising a target parameter, a policy parameter, and a class parameter. The target parameter may be referenced with a target index table to determine which interfaces to search. The policy parameter may be referenced with a policy index table to determine a node-id of a policy node corresponding to the policy parameter. A level for the desired node may be determined based on the node-id. The class parameter may be referenced with the determined node-id with a class index table to access a bucket location. The desired node may then be searched for with the determined node-id at the determined level.

15 Claims, 4 Drawing Sheets

METHOD AND APPARATUS FOR EFFICIENTLY ORGANIZING HIERARCHICAL QOS POLICIES

TECHNICAL FIELD

The present disclosure relates generally to the management of a Quality of Service ("QoS") policy hierarchy.

BACKGROUND

A modular QoS Command Line Interface ("CLI") may define a multi-layer queue hierarchy. A modular QoS CLI, or "MQC" may be a facility that provides a platform independent interface to configure QoS behaviors across various platforms. Specifically, hierarchical service policies may be formed by attaching a child service-policy to a parent class. This hierarchy may define a tree of nodes with the top-level class acting effectively as the root.

A typical service provider (access/aggregation) serving a multitude of customers may have as many QoS policies active and provisioned on the system at any point in time. As customer service level agreements ("SLA") or topology changes are required on the network, the service provider may have to dynamically execute inline updates of QoS policy configuration. Such a configuration update needs to take effect in a minimal amount of time to avoid service disruption. In addition, faster configuration updates may lead to better user experience. There exists a need to find relevant active policy/class/feature nodes buried inside large policies by using a combination of a unique node-id numbering scheme, multi-level hash tables and Adelson-Velskii and Landis ("AVL") trees to organize the hierarchical QoS policy.

BRIEF DESCRIPTION OF THE DRAWINGS

Many aspects of the disclosure can be better understood with reference to the following drawings. The components in the drawings are not necessarily to scale. Emphasis is instead placed upon clearly illustrating the principles of the present disclosure. Moreover, in the drawings, like references numerals designate corresponding parts through the several figures.

DETAILED DESCRIPTION OF EXAMPLE EMBODIMENTS

Figure 1:
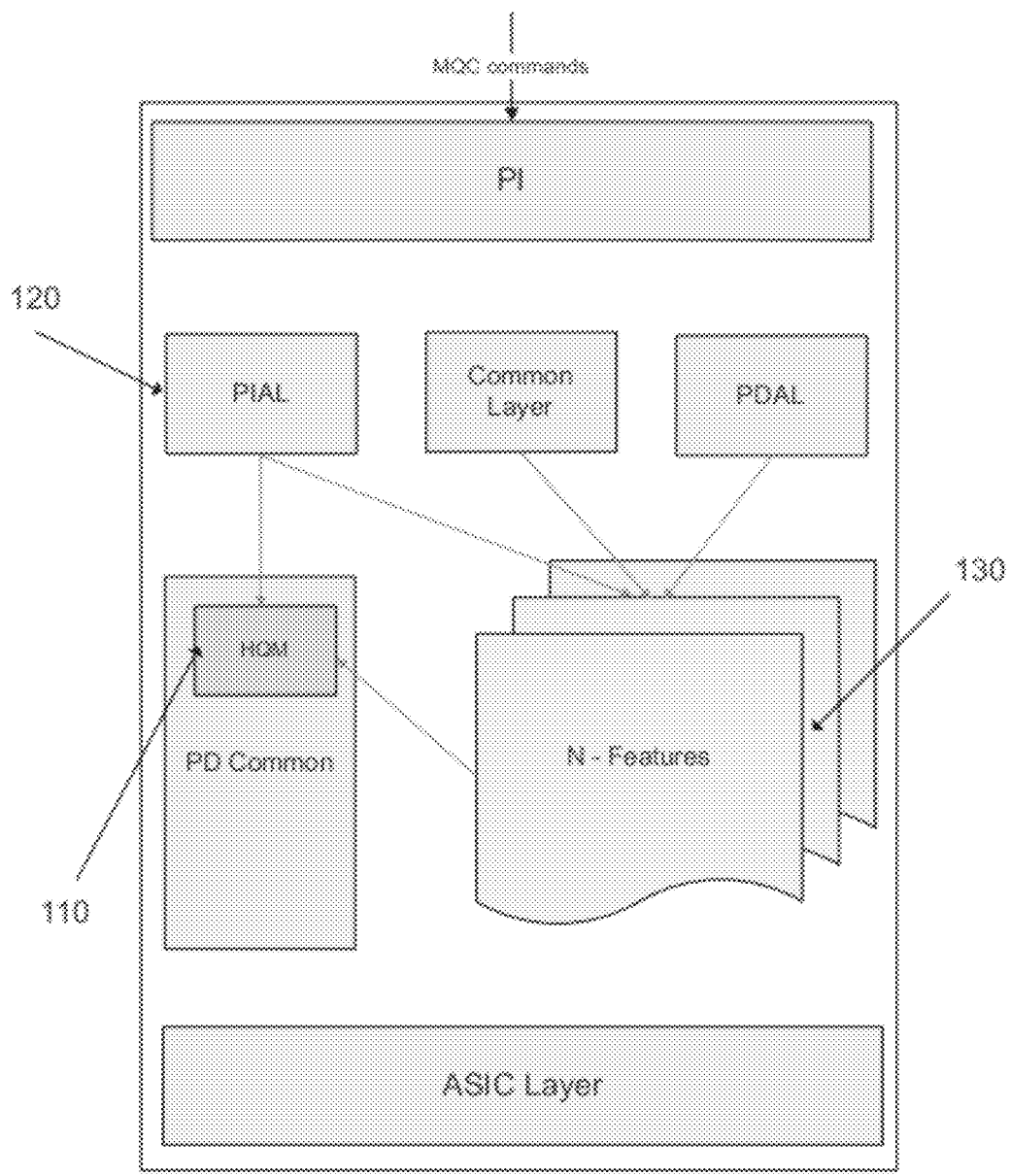
FIG. 1 is a block diagram illustrating an example environment in which certain embodiments of the present invention may be implemented.

In various embodiments, a method may be provided defining a hierarchical tree comprising target nodes, policy nodes, class nodes, and feature nodes. Each node may be identified with a unique id comprising a target id, a tree level, and a policy id. A target index table, a class index table, and a policy index table may be created. The system may receive a search string requesting a desired node comprising: a target parameter, a policy parameter, and a class parameter. The desired node id may be retrieved based on referencing at least one parameter to at least one index table. A level of the desired node based on the desired node id may then be determined. The desired node may then be retrieved based on the desired node id and determined level.

Consistent with embodiments of the present invention, a system may be provided comprising a first client capable of creating a hierarchical tree according to a configured hierarchical policy map and a second client capable of associating a plurality of features to a plurality of nodes in the hierarchical tree. The plurality of nodes may comprise: one or more target nodes corresponding to the physical or logical interface to which a policy map is attached; one or more policy nodes corresponding to the policy map; one or more class nodes corresponding to a class of the policy map; and one or more feature nodes corresponding to QoS features. The system may further comprise a processor programmed to: associate each of the class nodes, the policy nodes, and the target nodes with a unique node id; and locate a class node by referencing at least two of a target index table, a class index table, and a policy index table.

Consistent with embodiments of the present invention, a method may be provided comprising receiving a search string corresponding to a desired node comprising a target parameter, a policy parameter, and a class parameter. The target parameter may be referenced with a target index table to determine which interfaces to search. The policy parameter may be referenced with a policy index table to determine a node-id of a policy node corresponding to the policy parameter. A level for the desired node may be determined based on the node-id. The class parameter may be referenced with the determined node-id with a class index table to access a bucket location. The desired node may then be searched for with the determined node-id at the determined level.

Embodiments of the present invention may be used to represent the hierarchical QoS provisioning conceptually in the in the platform software in an efficient and a scalable manner. Some embodiments provide search and retrieve functions to search and retrieve the required active nodes, which may be buried in large policy maps attached to multiple physical and/or logical interfaces in a fast and efficient manner to enable dynamic configuration updates.

Embodiments of the present invention may comprise the platform representation of the hierarchical MQC QoS construct. The platform representation of the hierarchical MQC QoS construct may also be referred to as a "tree". Each policy/class may be represented by a node object/software structure. A node in the hierarchy may represent a set of traffic-streams/classification constructs. Links may interconnect the nodes to establish the hierarchical relationship between the nodes. Links may also interconnect nodes with their associated peers to a single target node, or separate targets. For example, in FIG. 2, there exists a link between p1.1.1 and p1.1.2 under t.1.1.x. Each node may also be associated with elements that may represent features and/or actions that may be applied to the traffic streams.

Embodiments of the tree in the present invention may provide application programming interfaces ("APIs") to other QoS modules for creating, traversing, and deleting tree nodes and associated features. In some embodiments, the tree structure may not be changed except through the APIs provided by the tree. It should also be noted that the tree may be implemented independent of the underlying hardware architecture.

FIG. 1 illustrates an example operating environment for embodiments of the present invention. Hierarchical tree 110 may have two main clients. The first client 120 may be a PIAL which can process a MQC hierarchical policy map and create the policy map hierarchy in hierarchical tree 110. A second client 130 may include individual QoS features (classification, policing, scheduling, etc.) capable of querying and configuring feature attribute on their corresponding node in the hierarchy. First client 120 may only call create/delete APIs, while the features 130 may call configure or traverse APIs.

API calls to hierarchical tree 110 may occur during three phases. First, during hierarchical tree 110 creation and configuration phase, hierarchical tree 110 may be created according to the configured hierarchical MQC policy map. Second, during configuration/parsing policy phase features may be applied by visiting hierarchical tree 110 nodes and associating the feature structure with the corresponding hierarchical tree 110 node. Third, during a dynamic modification phase, required hierarchical tree 110 nodes may be queried to add/modify/delete the nodes due to dynamic modification events.

Embodiments of the present invention may employ four types of nodes. For example, a first type of node may be an interface/target node. An interface/target node may correspond to the physical and/or logical interface to which the MQC policy map is attached. Next, a policy node may be employed. The policy node may correspond to an MQC policy map. A class node may correspond to an MQC class of a policy map. Finally, a feature node may correspond to the QoS actions/features configured on an MQC class. For example, the feature node may be associated with bandwidth, shape, queue limits, etc. The QoS feature associated with a class may be represented by a list of feature nodes that may be accessible from the class node.

Each node, except for feature nodes, may be associated with a unique node-id. When the node-ids are created, they may be assigned using a dotted decimal notation. The node-id numbering scheme is central to the search algorithm used to locate nodes in embodiments of this invention. In some embodiments, a 3-tuple structure may be used to identify nodes. For example, <target-id>.<level>.<policy-id> may be an example structure of the 3-tuple used.

Figure 2:
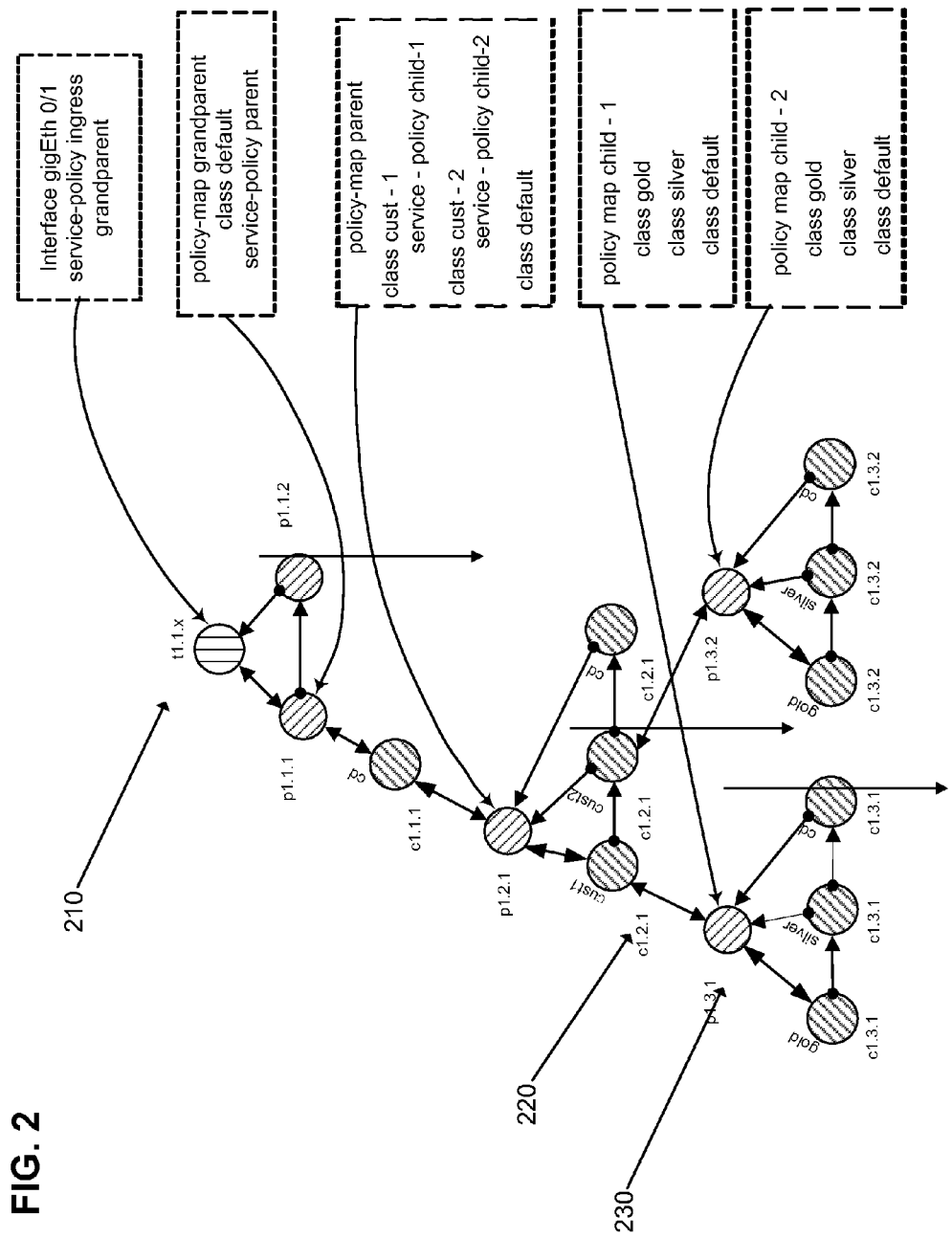
FIG. 2 illustrates embodiments of an example MQC policy in a hierarchical tree.

FIG. 2 illustrates embodiments of an example MQC policy in hierarchical tree 110. Nodes with a "t" prefix, are target nodes, such as target node 210. Nodes with a "c" prefix, are class nodes, such as class node 220. Nodes with a "p" prefix, are policy nodes, such as policy node 230.

Each node at a lower level may be considered the child of the node at its higher level. All nodes at the same level and with the same parent may be considered siblings. The arrow heads in FIG. 2 denote the parent-child relationship. For example, policy node 230 has all classes belonging to that policy as children class nodes.

The dotted decimal notation may inherently store information about the node's level in the hierarchy. The first number in the 3-tuple may be associated with a target. The second number may be associated with a level of the node in the hierarchy. The third number may be associated with the unique id of the policy. The node-id numbering scheme for different type nodes may be implemented as follows:
  Target node-id: <target-id>.1.<x> (All target nodes are at root level)
  Policy node-id: <target-id>.<level>.<policy-node-num>
  Class node-id: <target-id>.<level>.<policy-node-num of its parent policy map>
In the above examples, <x> may be set to 0. The node-id of a class node-id may be equal to the node-id of its parent policy node. As such, all class nodes under a policy node may have the same node-id.

Figure 3:
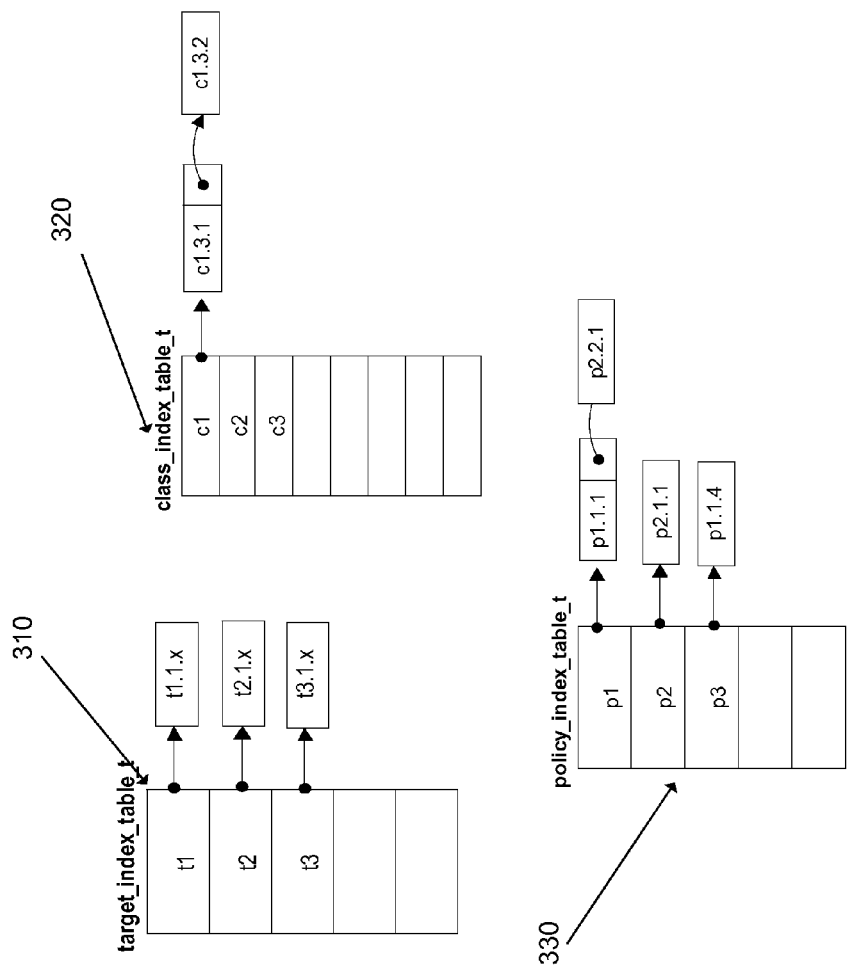
FIG. 3 illustrates embodiments of the relationship between class nodes and feature nodes.

Embodiments of the present invention may employ a number of dereferencing structures as illustrated in FIG. 3. For example, a target index table 310 may be a one level hash table. Target index table 310 may maintain the association between the interface (target) and the corresponding target nodes in the tree. A class index table 320 may also be employed. Class index table 320 may be a multi-level hash table which can maintain the association between the MQC class and the corresponding class nodes in the tree. The second level of hashing may be based on the level of the class node. Each bucket of the hash table may contain an AVL tree of class nodes associated with that index and level.

Also, a policy index table 330 may be a one-level hash table employed by embodiments of the present invention. Policy index table 330 may be used to maintain the association between the MQC policy and the corresponding policy nodes in the tree. Each bucket on the policy index table may contain an AVL Duplicate ("AVLDUP") tree of policy nodes. The AVLDUP tree may allow for multiple nodes of the same key in the AVL tree. This provides a sensible structure, as there may be multiple instances of the same policy attached to different targets and/or interfaces. The AVL tree stored in each bucket of the policy index table may allow for a O(log n) complexity search to locate the desired node.

The structure of the index tables and the node-id scheme may be particularly useful for searching the tree. For dynamic updates of MQC QoS configurations across a system a number of parameters may be used to query for the relevant nodes. Embodiments of the present invention may employ a target parameter, a policy parameter and a class parameter. Each of these parameters may be specified either by a value or by a search expansion function such as *.

An example search in embodiments of the present invention follows. The search for an affected policy and class across all interfaces (targets) on the system may comprise a (*, policy, class) search. Such a search may access the policy index table and the class index table. The (*, policy, class) search may cause the policy index table to be accessed first to determine the node-id of the policy node corresponding to the policy parameter in the search. From the node-id N, the search may determine the level of the policy parameter in the hierarchy.

Next, the appropriate bucket may be accessed corresponding to the class parameter in the class index table. An AVL search may then be performed for the desired class node with the node-id N at the appropriate level in the tree. Since a class may only occur once per policy, there would be a single instance of the class node C with the node-id prefix N. This produces a search result with a time complexity of O(log n).

A similar algorithm may be extrapolated for a search with other combinations of the (node, policy, class) search format. Such a scheme may allow for a search of any parameter combination in O(1), O(log n), or O(n) time complexity. Previous solutions required walking entire policy map trees on every interface to find out the relevant nodes. Such approaches result in exponential time complexity.

Embodiments for the present invention may include a policy map containing thousands of customers and a plurality of classes of service for each customer. In some embodiments, the classes may include video, voice, data, and best effort. For a system with 4000 customers, this may result in 4000 policy nodes and 16000 class nodes. A brute force search not employing embodiments of the present invention would require traversal of 20000 nodes. Using embodiments of the present invention, the time complexity may be reduced to O(log n), which may translate to around 15 transversals for the example. Subsequently, configuration update times may be reduced from many minutes to seconds or sub-seconds.

The tree of the present invention optimizes the time required to retrieve any particular node in the hierarchy. For example, the index tables allow access to the required nodes of the tree. Once access to a node is obtained, the traversal APIs may be employed to reach the desired node. The list of nodes corresponding to a particular bucket in the index table may provide the pointers to the nodes in the tree. The list of nodes corresponding to each bucket may be separated into "n" levels according to their level in the hierarchy. The search for a particular target, classmap, or policy is straightforward through the corresponding index tables.

For example, the search for a particular policy and class (policy, class) may be achieved by use of the policy index table and the class index table. The policy index table may be accessed first to find out the node-id of the policy node corresponding to the requested policy. From the determined node-id, the level of the policy in the hierarchy can be determined. Subsequently, access to the desired class in the class index table may be determined and the class node with the determine node-id can be found at the determined policy level.

Embodiments of efficient hierarchical organization may be implemented in hardware, software, firmware, or a combination thereof (collectively or individually also referred to herein as logic). To the extent certain embodiments, or portions thereof, are implemented in software or firmware, executable instructions or code for performing one or more tasks of efficient hierarchical organization are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments, or portions thereof, are implemented in hardware, efficient hierarchical organization may be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Figure 4:
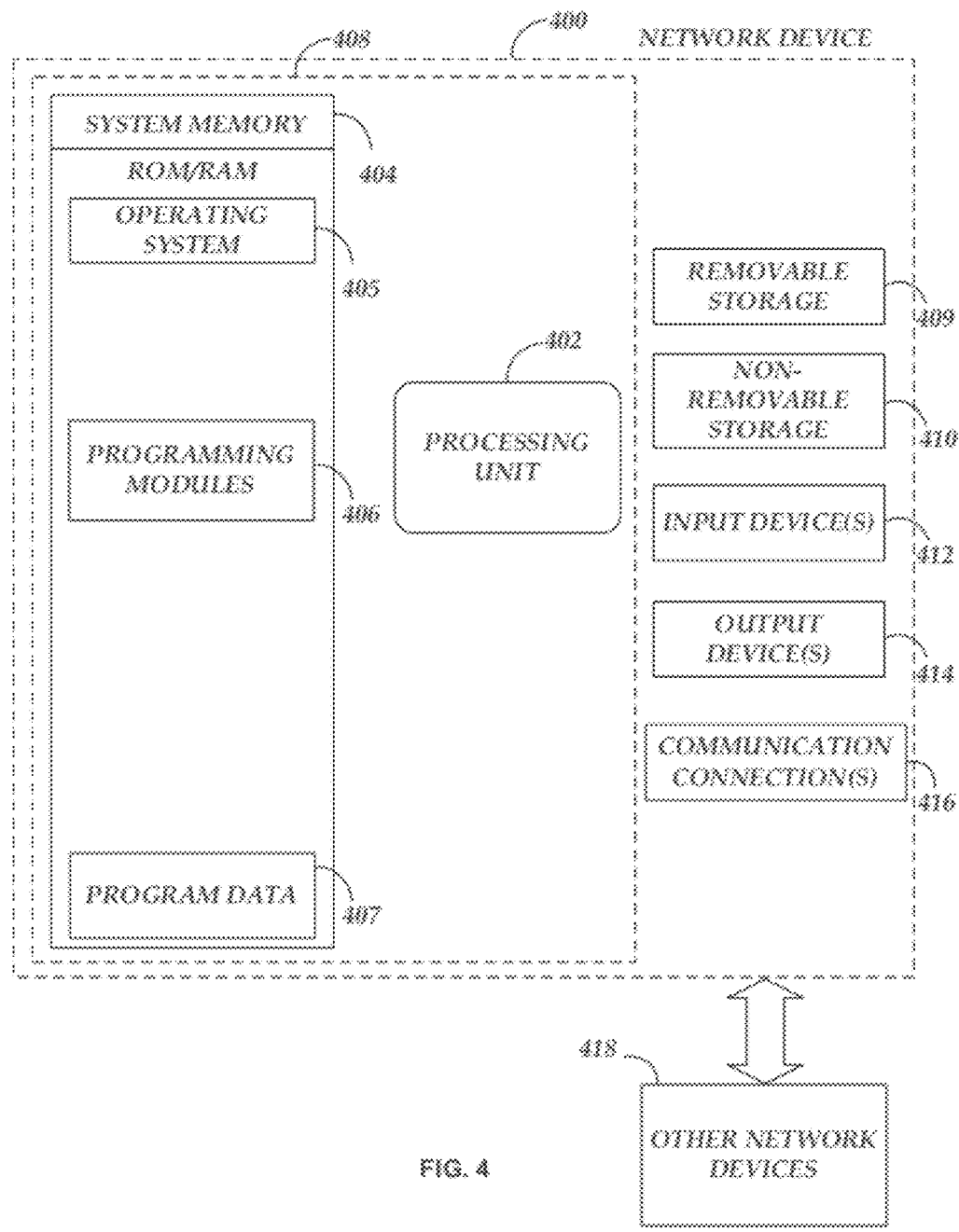
FIG. 4 is a block diagram of a system including a network device.

FIG. 4 is a block diagram of a system including network device 400. Consistent with embodiments of efficient hierarchical organization, the aforementioned memory storage and processing unit may be implemented in a network device, such as network device 400 of FIG. 4. Any suitable combination of hardware, software, or firmware may be used to implement the memory storage and processing unit. For example, the memory storage and processing unit may be implemented with network device 400 or any of other network devices 418, in combination with network device 400. The aforementioned system, device, and processors are examples and other systems, devices, and processors may comprise the aforementioned memory storage and processing unit, consistent with embodiments of efficient hierarchical organization. Furthermore, network device 400 may comprise an operating environment for system 100 as described above. System 100 may operate in other environments and is not limited to network device 400.

With reference to FIG. 4, a system consistent with embodiments of efficient hierarchical organization may include a network device, such as network device 400. In a basic configuration, network device 400 may include at least one processing unit 402 and a system memory 404. Depending on the configuration and type of network device, system memory 404 may comprise, but is not limited to, volatile (e.g., random access memory (RAM)), non-volatile (e.g., read-only memory (ROM)), flash memory, or any combination. System memory 404 may include operating system 405, one or more programming modules 406, and may include a program data 407. Operating system 405, for example, may be suitable for controlling network device 400's operation. Furthermore, embodiments of efficient hierarchical organization may be practiced in conjunction with a graphics library, other operating systems, or any other application program and is not limited to any particular application or system. This basic configuration is illustrated in FIG. 4 by those components within a dashed line 408.

Network device 400 may have additional features or functionality. For example, network device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by network device 400. Any such computer storage media may be part of device 400. Network device 400 may also have input device (s) 412 such as a keyboard, a mouse, a pen, a sound input device, a touch input device, etc. Output device(s) 414 such as a display, speakers, a printer, etc. may also be included. The aforementioned devices are examples and others may be used.

Network device 400 may also contain a communication connection 416 that may allow device 400 to communicate with other network devices 418, such as over a network in a distributed network environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 may perform processes including, for example, one or more method 400's stages as described above. The aforementioned process is an example, and processing unit 402 may perform other processes.

Generally, consistent with embodiments of efficient hierarchical organization, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments of efficient hierarchical organization may also be practiced in distributed network environments where tasks are performed by remote processing devices that are linked through a communications network. In a distributed network environment, program modules may be located in both local and remote memory storage devices.

Furthermore, embodiments of efficient hierarchical organization may be practiced in an electrical circuit comprising discrete electronic elements, packaged or integrated electronic chips containing logic gates, a circuit utilizing a microprocessor, or on a single chip containing electronic elements or microprocessors. Embodiments may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of efficient hierarchical organization, for example, may be implemented as a computer process (method), a network system, or as an article of manufacture, such as a computer program product or computer readable media. The computer program product may be a computer storage media readable by a computer system and encoding a computer program of instructions for executing a computer process. The computer program product may also be a propagated signal on a carrier readable by a network system and encoding a computer program of instructions for executing a computer process. Accordingly, aspects of efficient hierarchical organization may be embodied in hardware and/or in software (including firmware, resident software, micro-code, etc.). In other words, embodiments of efficient hierarchical organization may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of efficient hierarchical organization.

At least the following is claimed:

1. A method comprising:
   defining a hierarchical tree at a platform independent application layer comprising target nodes, policy nodes, class nodes, and feature nodes, wherein the feature nodes are associated with shape, and wherein the feature nodes comprise linked lists of features;
   identifying each target node, policy node, and class node with a unique id comprising a target id, a tree level, and a policy id, wherein the unique node id comprises a dotted decimal notation, and wherein the dotted decimal notation comprises numbers representative of at least a target id, a level, and a policy id;
   identifying each feature node with a non-unique id;
   creating a target index table;
   creating a class index table, wherein the class index table is a multi-level hash table, and wherein each bucket of the hash table comprises an AVL tree of class nodes associated with that index and level;
   creating a policy index table;
   receiving a search string requesting a desired node comprising: a target parameter, a policy parameter, and a class parameter;
   retrieving the desired node id based on referencing at least one parameter to at least one index table;
   determining a level of the desired node based on the desired node id;
   retrieving the desired node based on the desired node id and determined level; and
   configuring the desired node.

2. The method of claim 1, wherein the search string is received in response to a change in a service level agreement.

3. The method of claim 1, wherein the feature nodes are associated with at least one of: bandwidth and queue limits.

4. The method of claim 1, wherein retrieving the desired node id further comprises:
   searching the policy index table using the target parameter as a key to locate the node id of the policy node corresponding to the policy parameter;
   determine a level in the hierarchical tree of the policy node; and
   searching the class index table for the class node corresponding to the policy parameter and the level.

5. The method of claim 4, wherein the index tables are arranged as an AVL tree.

6. A system comprising:
   a first client configured to create a hierarchical tree according to a configured hierarchical policy map, wherein the first client comprises a platform independent application layer; and
   a second client configured to create a plurality of features to a plurality of nodes in the hierarchical tree, wherein the features are associated with shape, wherein the second client comprises a platform dependent application layer, and wherein the features comprise one or more linked lists wherein the plurality of nodes comprises:
     one or more target nodes corresponding to the physical or logical interface to which a policy map is attached;
     one or more policy nodes corresponding to the policy map;
     one or more class nodes corresponding to a class of the policy map; and one or more feature nodes corresponding to QoS features; and a processor programmed to:

associate each of the policy nodes, the class nodes, and the target nodes with a unique node id wherein the unique node id comprises a dotted decimal notation, and wherein the dotted decimal notation comprises numbers representative of at least a target id, a level, and a policy id; and locate a class node by referencing at least two of a target index table, a class index table, and a policy index table, wherein the class index table is a multi-level hash table, and wherein each bucket of the hash table comprises an AVL tree of class nodes associated with that index and level.

7. The system of claim 6, wherein each class node provides access to a plurality of associated features.

8. The system of claim 6, wherein the each bucket in the policy index table contains an AVLDUP tree of policy nodes.

9. The system of claim 6, wherein a second level of hashing in the multi-level hash table is based on the level of the class node.

10. A method comprising:

receiving a search string at a platform independent application layer corresponding to a desired node comprising a target parameter, a policy parameter, and a class parameter;

referencing the target parameter with a target index table to determine which interfaces to search;

referencing the policy parameter with a policy index table to determine a node-id of a policy node corresponding to the policy parameter;

determining a level for the desired node based on the node-id, wherein the unique node id comprises a dotted decimal notation, and wherein the dotted decimal notation comprises numbers representative of at least a target id, a level, and a policy id;

referencing the class parameter and the determined node-id with a class index table to access a bucket location, wherein the class index table is a multi-level hash table, and wherein each bucket of the hash table comprises an AVL tree of class nodes associated with that index and level, wherein the class nodes are associated with shape, and wherein the class nodes comprise linked lists of features; and searching for the desired node with the determined node-id at the determined level.

11. The method of claim 10, wherein the target parameter is a search expansion value.

12. The method of claim 10, wherein a bucket provides a plurality of pointers to node locations.

13. The method of claim 12, wherein the plurality of pointers are separated based on their corresponding level.

14. The method of claim 10, further comprising altering the features associated with the desired node.

15. The method of claim 10, wherein each class node provides access to a plurality of associated features.

* * * * *